455-606 AU 233 EX
FIP8106 OR 3,290,503
EXAMINER

Dec. 6, 1966 C. W. STAUFENBERG ETAL 3,290,503
LIGHT COMMUNICATION SYSTEM
Filed May 6, 1963 3 Sheets-Sheet 1

INVENTORS
CHARLES W. STAUFENBERG
DONALD H. WARD
BY Robert T. Dunn
AGENT

LIGHT COMMUNICATION SYSTEM

Filed May 6, 1963 3 Sheets-Sheet 2

INVENTORS
CHARLES W STAUFENBERG
DONALD H. WARD
BY Robert T Dunn
AGENT

INVENTORS
CHARLES W. STAUFENBERG
DONALD H. WARD

BY Robert T. Dunn
AGENT

United States Patent Office 3,290,503

Patented Dec. 6, 1966

3,290,503

LIGHT COMMUNICATION SYSTEM

Charles W. Staufenberg, Santa Barbara, Calif., and Donald H. Ward, Glen Ellyn, Ill., assignors to Raytheon Company, Lexington, Mass., a corporation of Delaware Filed May 6, 1963, Ser. No. 278,019
5 Claims. (Cl. 250—199)

This invention relates to signal systems, and more particularly to systems for transmitting and receiving modulated rays of visible or near visible light.

The art of light communication between distant points is old and has been practiced in the heliograph and numerous similar devices in which a light beamed from a source to a target is mechanically interrupted in accordance with information signal so that the signal modulates the light beamed to a distant point where the same information is detected in the received beam of light. Information is imposed on a beam of light by interrupting a substantially steady beam of light from a source by deflecting the light with a galvanometer mirror. Information signal is applied to the galvanometer and causes slight movements of the mirror which in turn direct the light from the source in such a manner that it is modulated, and this modulated beam is then directed toward a distant point conveying the information thereto. The receiver in such a system usually includes a photocell upon which the incident modulated light beam is focused, and the output of the photocell represents the information signal. Heretofore, communicating systems of this type have included transmitting and receiving equipment at each station so that each station may send as well as receive information over separate light paths. Accordingly, at each station there is a transmitter and receiver with separate light paths to each, and each light path includes separate focusing and reflecting devices. It is one object of the present invention to employ a common light path for sending and receiving and to employ at least some of the focusing and reflecting apparatus at a station to both transmit and receive modulated light signals.

In accordance with the present invention, each station of a communication system is equipped with a substantially constant intensity source of visible light which is focused by a concave mirror upon a galvanometer mirror, the source and the galvanometer mirror being located at substantially aplanatic points of the mirror. The galvanometer mirror reflects to a plane mirror which in turn reflects to a large objective mirror. The galvanometer mirror is so situated with respect to the objective mirror that minute rotations or deflections of the galvanometer mirror induced by information signals applied to the galvanometer coil will direct the light focused thereon to substantially fully illuminate the objective mirror or to illuminate only a small portion of the objective mirror. The objective mirror is preferably parabolic and serves to beam the light impinging thereon in substantially parrallel rays toward a distant station. Thus, the intensity of light beamed from the objective mirror is modulated by the rotational deflections or motions of the galvanometer mirror.

It is another feature of the present invention to provide means for switching the focal point of the objective mirror so that during periods when information is not being transmitted from the station, light signals from a distant station or from any other source will be focused by the objective mirror onto a light sensitive device generating a signal therein indicative of modulations of the incident light. When each of the stations is provided with such equipment, two-way communication is possible between them, and each is capable of transmitting information, while the other is receiving. This information may consist of audio signals, pulsed signals, or any other sort of amplitude modulation upon a beam of visible or near visible light which is capable of detection.

Other features and objects of the present invention will be more apparent from the following specific description taken in conjunction with the drawings in which.

Figure 1:
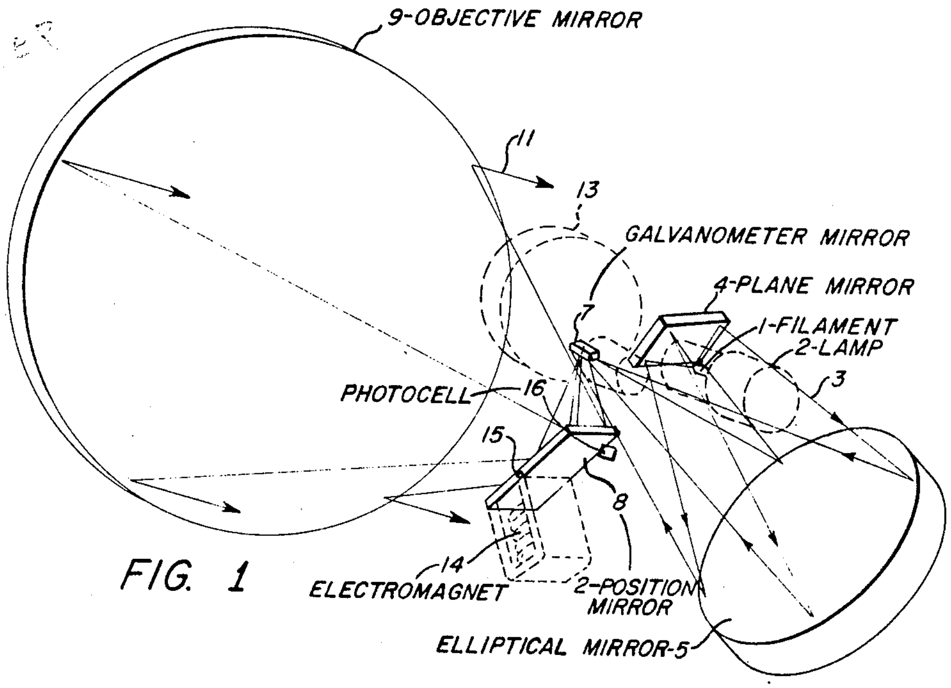
FIG. 1 is an isometric view to illustrate the relative positions and shapes of reflecting surfaces of a device for transmitting a modulated light beam and receiving and detecting modulations of an incident light beam.

Turning first to FIG. 1, there is shown an isometric view with reflecting surfaces positioned for transmission. These surfaces are shown in solid line, and associated equipment for supporting and/or controlling the surfaces is shown in broken line. The light source 1 is, for example, a filament in an incandescent lamp 2 to which substantially steady power is supplied during transmission so that the light intensity remains substantially constant. Light from the filament 1 represented by lines such as line 3 is reflected by a plane mirror 4, preferably located quite close to the filament 1, to the elliptical mirror 5. The mirror 5 focuses the light on a D'Arsonval moving coil galvanometer mirror 7 which in turn reflects to a plane two-position mirror 8 and from there to the objective mirror 9 which focuses the light to substantially parallel rays 11 which are beamed toward a distant target or a distant station.

The light path from the filament 1 to the mirror 4 and then to the elliptical mirror 5, and the light path from the elliptical mirror 5 to the galvanometer mirror 7 are preferably aplanatic paths, and thus the filament 1 and the mirror 7 are positioned at aplanatic points of the mirror 5. Aplanatic points can be closely approximated if mirror 5 is spherical and the two points are positioned relatively close togther. However, precise focusing without particular regard to the distance between the points is best achieved with an aplanatic mirror such as an elliptical mirror. This design insures a sharp focusing of light from the filament 1 upon the galvanometer mirror 7 so that substantially all light intercepted by mirror 4 will fall upon the galvanometer mirror.

The surface of the objective mirror 9 is preferably parabolic, and the light path from the galvanometer mirror 7 to the two-position mirror 8 and thence to the center of the objective mirror is preferably equal to the light path from the focus to the center of the parabolic surface. This insures that light from the galvanometer mirror 7 will be reflected from the parabolic objective mirror 9 in parallel rays toward a distant target.

In operation during transmission, the various reflecting surfaces are positioned as shown in FIG. 1, and an information signal is applied to the galvanometer coil causing the galvanometer mirror 7 to oscillate in synchronism with the signal. As the galvanometer mirror 7 swings through a complete cycle, it will sweep the light cone from filament 1 across the face of the objective mirror 9 so that during one portion of the cycle, the objective mirror 9 will be substantially fully illuminated, whereas during another portion only a small fraction of the objective mirror will be illuminated. Thus, the amount of light beamed toward the distant target will fluctuate in synchronism with the information signal.

During a receive interval when no information is transmitted, substantially parallel light from a distant target modulated in accordance with an information signal will fall upon the objective mirror 9 and will be focused at the focal point of this mirror. During the receive interval, the two-position mirror 8 will be removed from the path of the light focused by the objective mirror by the action of an electromagnet 14 which rotates mirror 8 about an axis 15. The light from the objective mirror 9 will then be focused upon a photocell 16 located at the focal point of the mirror. Thus, substantially the same light path to and from the objective mirror 9 is employed during both transmission and receiving.

Figure 2:
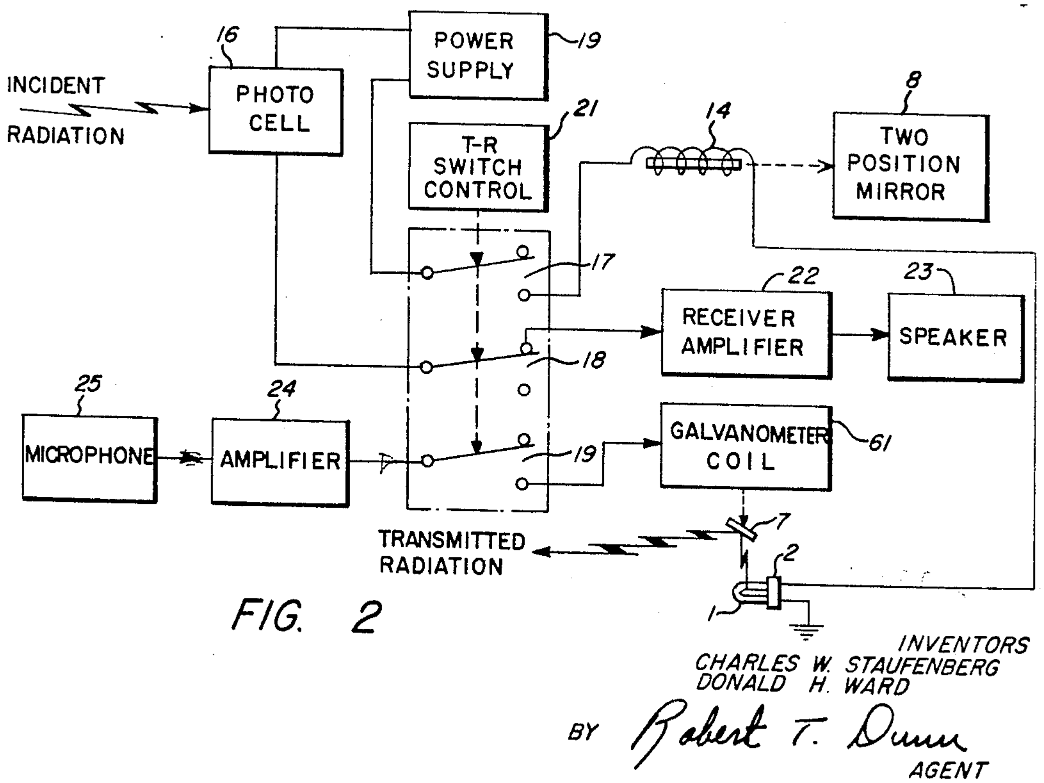
FIG. 2 is a block diagram illustrating electrical components employed at one station in conjunction with the apparatus shown in FIG. 1.

FIG. 2 is a block diagram showing associated electrical equipment used with the system shown in FIG. 1 whereby the system is controlled to transmit radiation during a transmit interval and to receive incident radiation during a receive interval. More particularly, this illustrates part of a system for transmitting voice signals from one station to another. During a receive interval, a bank of switches 17, 18 and 19 is positioned as shown by a switch control 21. As a result, magnet 14 is deenergized and positions the two-position mirror 8 so that radiation incident upon the objective mirror 9 is focused on the photocell 16. The photocell 16 is preferably a lead sulphide detector whose resistance changes with changes in the amount of incident light. It is preferably in series with a fixed voltage and a resistance, and so the voltage across the resistance is a signal representative of the amount of light focused upon the cell, and this signal is applied via switch 18 to a receiver amplifier 22 which in turn energizes a speaker 23. If the incident radiation is modulated by voice signals then the speaker will emit the voice sounds.

During the transmit interval, the switches 17–19 are positioned at their lower terminals. As a result, the solenoid 14 is energized, and the two-position mirror 8 is positioned as shown in FIG. 1 between the objective mirror 9 and the photocell 16. At the same time, switch 19 connects the output of amplifier 24 to the galvanometer coil 61. An operator then employs the microphone 25 to energize the amplifier which in turn energizes the coil deflecting the mirror 7 so that light from the filament 1 in the lamp 2 illuminates varying portions of the objective mirror 9 depending upon the audio signal from the microphone. Thus, a voice modulated light beam is transmitted toward a distant target where similar equipment to that shown in FIGS. 1 and 2 intercepts the light beam to energize a speaker.

Figure 7:
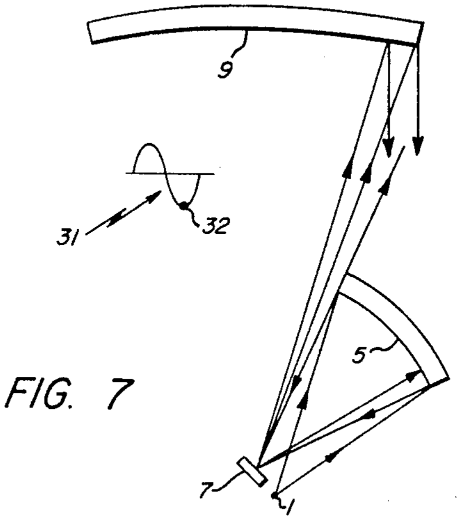
FIGS. 7–9 show light paths to illustrate dynamic operation during transmission.
Figure 8:
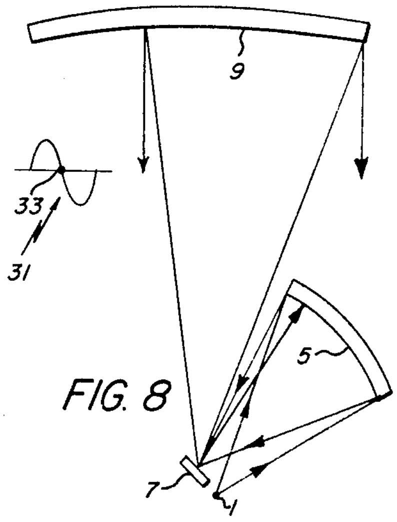
Figure 9:
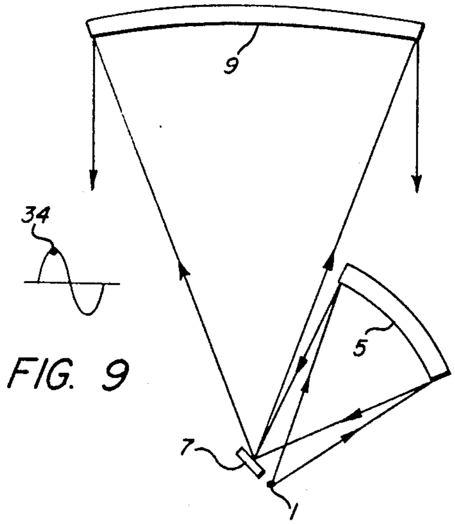
Figure 10:
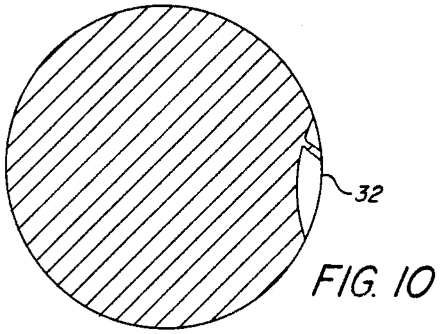
FIGS. 10–12 show illumination patterns on an output window during transmission which correspond to the light paths shown in FIGS. 7–9, respectively.
Figure 11:
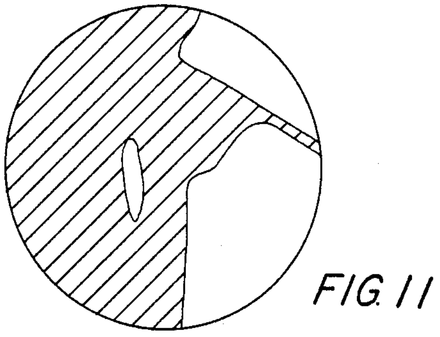
Figure 12:
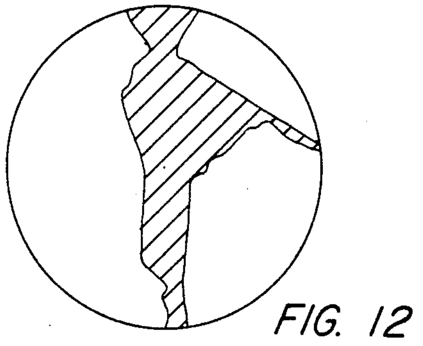

FIGS. 7–9 illustrate the manner in which the galvanometer mirror 7 directs light from the filament 1 toward the parabolic objective mirror 9. Each of these figures shows the galvanometer mirror in a different position corresponding to the phase of the information signal 31 being transmitted. The galvanometer mirror 7 is positioned when energized by the information signal in such a manner that at the extreme excursion of the information signal on one polarity, illustrated by point 32 in FIG. 7, the mirror 7 directs very little light to the object mirror 9. As a result, the object mirror is illuminated somewhat as illustrated in FIG. 10; only one corner of this mirror is bright, the rest is in darkness. Between the extremes of excursions at, for example, point 33, in FIG. 8, about half of the object mirror 9 is illuminated by the mirror 7 as shown in FIG. 11. The irregularities of this illumination are caused by various components of the system which are in the path of the parallel rays emanating from the object mirror, and so the fractions of illuminations shown in FIGS. 10, 11 and 12 represent the amount of light transmitted toward a distant station during various portions of the information cycle 31. At the extreme excursion of the information signal in the other polarity shown by point 34 in FIG. 9, the maximum amount of the object mirror 9 is illuminated, and so the maximum amount of light is transmitted to the distant target as shown by the pattern in FIG. 12.

As already mentioned, the filament 1 and the galvanometer mirror 7 are preferably located at aplanatic points of the mirror 5, and as a result, light emanating from the filament is focused on the mirror 7. The light path from the filament 1 to the mirror 5 includes a reflection from plane mirror 4. This reflection from plane mirror 4 is not shown in the FIGURES 7–9, and so the figures are simplified. The purpose of the mirror 4 is to intercept a given solid angle of light from the filament and direct substantially all of this toward the elliptical mirror 5. In addition, it has been found convenient to employ the mirror 4 because it permits a more convenient location for the lamp 2. The reflection from the two-position mirror 8 between mirrors 7 and 9 is also omitted from FIGS. 7–9 for the same reason mirror 4 is omitted.

Figure 3:
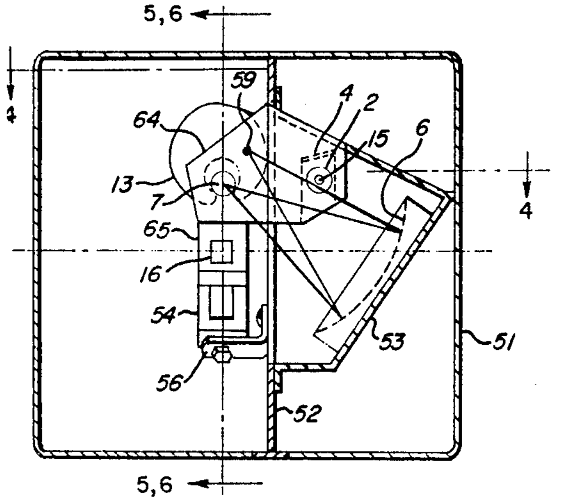
FIGS. 3 and 4 are front and plan views of the apparatus shown in FIG. 1 enclosed within a container.
Figure 4:
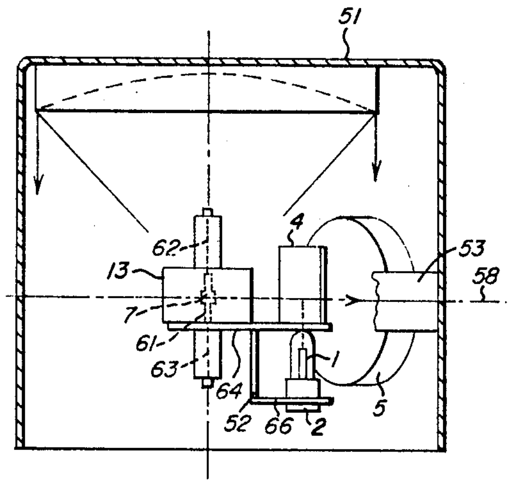

FIGS. 3 and 4 are front and plan views, respectively, of the system shown in FIG. 1 to illustrate the compact arrangement of elements within a housing 51. The various parts are supported within the housing 51 by supports 52 and 53. Support 52 carries the galvanometer, the magnetic actuator 14, mirror 8, photocell 16, lamp 2 and plane mirror 4, while support 53 carries only the concave or elliptical mirror 5. Magnet 14 is contained within a frame 54 to which the folding mirror 8 is attached. The frame 54 is attached by bracket 56 to support 52.

The center of reflection from plane mirror 4 and galvanometer mirror 7 are preferably located in a transverse plane 58 which passes through the axis of the mirror 5 as shown in FIG. 4. As a result, the filament 1 is effectively located at one of the substantially aplanatic points 59 of the mirror 5 represented by the intersection of the light lines in FIG. 3, while the galvanometer mirror 7 is located at the other aplanatic point of mirror 5. By this arrangement, an image of the filament is always formed on the mirror 7.

The active parts of the galvanometer shown in FIG. 4 include the mirror 7 mounted on a very fine coil 61 which is suspended between the poles of the magnet 13 by suspension wires 62 and 63. These wires carry an input signal to the coil and also provide a torsion spring action which resists rotation of the coil and mirror when the input signal is applied.

The moving parts of the galvanometer are preferably mounted in a tube attached to the permanent magnet 13, and the magnet is attached to the support 52 by a plate 64 which also carries the plane mirror 4. Another plate 65 attached to plate 64 carries the photocell 16. The lamp 2 is supported at its base by attachment to a plate 66 also fixed to the support 52.

The support 53 which carries the concave mirror 5 is attached at its lower end to support 52 and at its upper end to plate 64.

Figure 5:
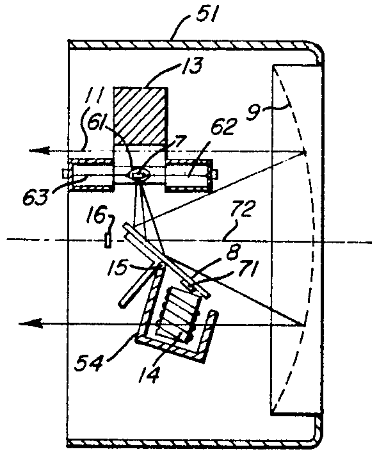
FIGS. 5 and 6 are side views of the apparatus to show operation during transmit and receive intervals, respectively.
Figure 6:
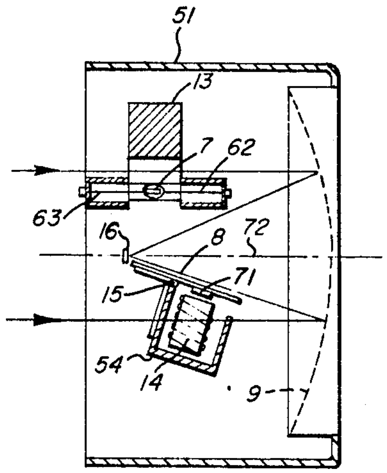

FIGS. 5 and 6 illustrate positioning of the two-position mirror 8 during transmit and receive intervals, respectively. In order to transmit, the magnet 14 is energized through switch 17, shown in FIG. 2, causing a magnetically permeable member 71 attached to the back of part of the mirror 8 to move toward the magnet rotating the mirror 8 about its axis 15 to the position shown in FIG. 5. When in this position, a light path represented by line 72 from the mirror 7 to the mirror 8 and then to the center of object mirror 9 is equal to the distance from the center of the object mirror 9 to its focal point where the photocell 16 is located. Thus, mirror 8 shifts the focal point of the object mirror from the photocell 16 to the galvanometer mirror. During the receive interval, the magnet 14 is deenergized, and mirror 8 falls to the position shown in FIG. 6 so that parallel light incident upon the object mirror 9 is focused on the photocell 16. Thus, it is seen that substantially the same light path at each station between the object mirror 9 to its focal point is employed during both transmit and receive intervals.

This completes the description of one embodiment of the invention showing apparatus for transmitting modulated light signals and for receiving and demodulating incident modulated light signals. Basically, the equipment consists of a source of light and a highly mobile mirror located at one of the aplanatic points of an elliptical mirror with additional reflective surfaces for directing light from the mobile mirror to an object mirror, and further including a photocell at the focal point of the object mirror, the general arrangement being such that the mobile mirror is also located at a focal point of the object mirror and illuminates the object mirror during transmit intervals, whereas the photocell is illuminated from the object mirror during receive intervals. It should be understood, however, that other types of reflecting surfaces and/or focusing lenses could be employed to achieve the same general effect without deviating from the spirit and scope of the invention as set forth in the accompanying claims.

What is claimed is:

1. A light communication system comprising:
an aplanatic mirror;
a source of light and a movable mirror located at aplanatic focal points of said aplanatic mirror and spaced-apart therefrom, the light from said source being reflected by said aplanatic mirror to said movable mirror;
an objective mirror;
photosensitive means;
a two-position mirror means for blocking the light path between said photosensitive means and said objective mirror during one interval and for directing light from said movable mirror toward said objective mirror during the same interval when said two-position mirror is located in a first position;
and means for removing and placing said two-position mirror in a second position during another interval so that incident light from another source falling upon said objective mirror is focused on said photosensitive means.

2. A light communication system comprising:
an elliptical mirror;
a source of light and a highly mobile mirror located at different aplanatic points of said elliptical mirror and spaced-apart therefrom, the light from said source being reflected by said elliptical mirror to said mobile mirror;
a plane mirror spaced-apart from said elliptical mirror for intercepting a portion of the light from said source and directing substantially all of said portion to said elliptical mirror;
a curved objective mirror;
photosensitive means;
a two-position plane mirror means for blocking the light path between said photosensitive means and said objective mirror during one interval and for directing light from said mobile mirror toward said objective mirror during the same interval when said two-position mirror is located in a first position;
and means for removing and placing said two-position plane mirror in a second position during another interval so that incident light from another source falling upon said objective mirror is focused on said photosensitive means.

3. A light communication system comprising:
an elliptical mirror;
a source of light located at one aplanatic point of said elliptical mirror;
a plane mirror spaced-apart from said elliptical mirror for intercepting a portion of the light from said source and directing substantially all of said portion to said elliptical mirror;
a galvanometer mirror located at another aplanatic point of said elliptical mirror;
a parabolic objective mirror;
a multiposition plane mirror for directing light from said galvanometer mirror to said parabolic reflector when in one position;
photosensitive means located so that said multiposition mirror allows light from said objective mirror to fall on said photosensitive element when in a second position;
means for moving said galvanometer mirror in response to information signals when said multiposition mirror is in said one position so that a beam of modulated parallel light is reflected from said objective mirror toward a target;
and indicating means energized by signals produced in said photosensitive element when said multiposition mirror is in said second position.

4. A light communication system comprising:
an elliptical mirror;
a source of light located at one aplanatic point of said elliptical mirror;
a plane mirror spaced-apart from said elliptical mirror for intercepting a portion of the light from said source and directing substantialy all of said portion to said elliptical mirror;
a moving coil galvanometer mirror located at another aplanatic point of said elliptical mirror;
a parabolic objective mirror;
a multiposition mirror for reflecting light from said galvanometer mirror toward said objective mirror when in a first position;
electromagnetic means for selectively placing said multiposition mirror in one position by rotating said multiposition mirror;
photosensitive means positioned so that said multiposition mirror allows light from said objective mirror to fall on said photosensitive means when in a second position;
means for moving said galvanometer mirror in response to information signals when said multiposition mirror is in said first position;
and indicating means energized by signals produced in said photosensitive element when said two-position mirror is in said second position.

5. A light communication system comprising:
an elliptical mirror;
a source of light located at one aplanatic point of said elliptical mirror;
a solid plane mirror spaced-apart from said elliptical mirror for intercepting a portion of the light from said source and directing substantially all of said portion to said elliptical mirror;
a moving coil galvanometer mirror located at another aplanatic point of said elliptical mirror;
a parabolic objective mirror;
a two-position plane mirror for reflecting light from said galvanometer mirror toward said objective mirror when in the first position;
switching means coupled to electromagnetic means for selectively placing said two-position mirror in one position by rotating said two-position mirror about an axis;
photosensitive means located so that said two-position mirror allows light from said objective mirror to fall on said photosensitive element when in the second position;
means for deflecting said galvanometer mirror in response to information signals when said two-position mirror is in said first position so that a beam of modulated parallel light is reflected from said objective mirror toward a target;
and indicating means energized by signals produced in said photosensitive element when said two-position mirror is in said second position.

(References on following page)

References Cited by the Examiner

UNITED STATES PATENTS

| | | | |
|---|---|---|---|
| 796,254 | 8/1905 | Hartman | 250—199 |
| 1,973,089 | 9/1934 | Mechau | 250—199 |
| 2,153,709 | 4/1939 | Bournisien | 250—199 |
| 2,421,468 | 6/1947 | Singer. | |

FOREIGN PATENTS

| | | |
|---|---|---|
| 124,805 | 4/1919 | Great Britain. |
| 400,115 | 10/1933 | Great Britain. |

DAVID G. REDINBAUGH, *Primary Examiner.*

JOHN W. CALDWELL, *Examiner.*